(No Model.)

L. DE ROME.
BICYCLE.

No. 571,302. Patented Nov. 10, 1896.

Witnesses:

Inventor
L. De Rome
By James Sheehy
Attorney

UNITED STATES PATENT OFFICE.

LOUIS DE ROME, OF SAN FRANCISCO, CALIFORNIA.

BICYCLE.

SPECIFICATION forming part of Letters Patent No. 571,302, dated November 10, 1896.

Application filed December 9, 1895. Serial No. 571,583. (No model.)

*To all whom it may concern:*

Be it known that I, LOUIS DE ROME, a citizen of the United States, residing at San Francisco, in the county of San Francisco and State of California, have invented certain new and useful Improvements in Bicycles; and I do declare the following to be a full, clear, and exact description of the invention, such as will enable others skilled in the art to which it appertains to make and use the same.

My invention relates to improvements in bicycles; and it has for its general object to provide an attachment for safety-bicycles designed and adapted to afford a comfortable seat for a child in rear of the rider, and one which may be applied to safety-bicycles such as at present in use without materially altering the construction or increasing the weight of the same, and which will not interfere with the rider in mounting or dismounting or while he is riding.

Other objects and advantages of the invention will be fully understood from the following description and claims when taken in conjunction with the annexed drawings, in which—

Figure 1:
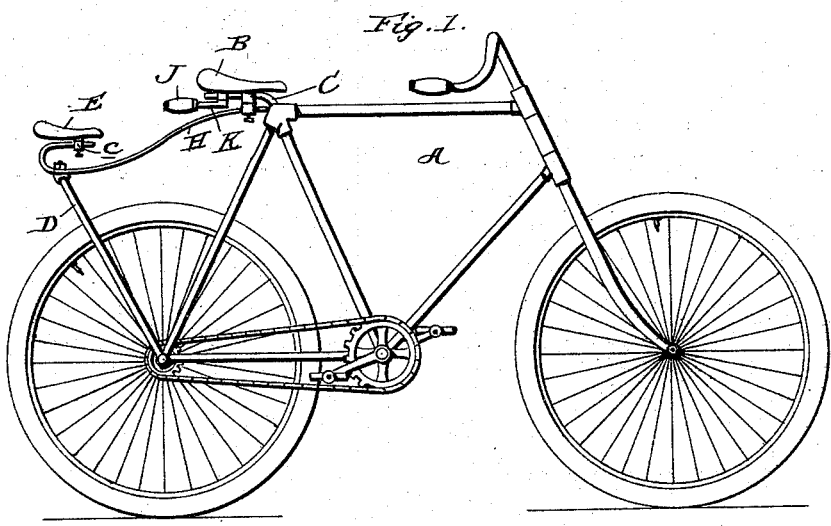
Figure 2:
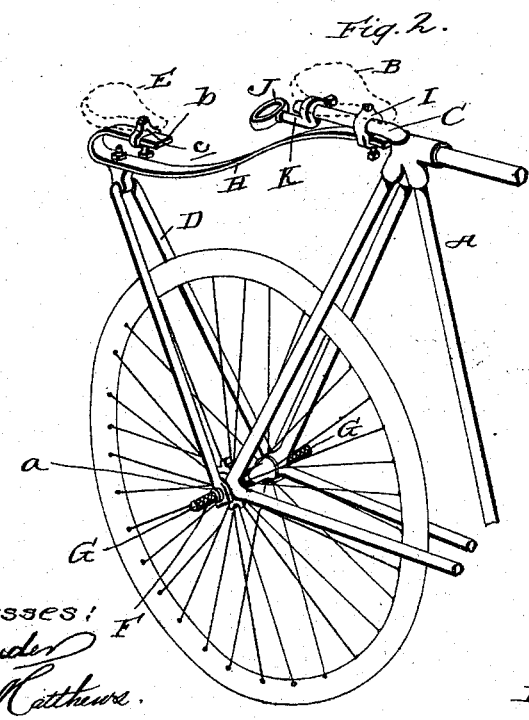

Figure 1 is a side elevation of a bicycle equipped with my improvements; and Fig. 2 is a detail perspective view of the rear portion of the same, illustrating the preferred manner of connecting the improvements.

Referring by letter to said drawings, A indicates a safety-bicycle having the usual frame A', rider's seat B, and seat-support C, and D indicates the fork, which forms a portion of my improvements and the chief support of the auxiliary seat E, which is designed to carry a child and is arranged in rear of the driver's seat and preferably in a plane below that of said rider's seat, so as not to interfere with the rider in mounting or dismounting from the machine. The fork D straddles the rear wheel of the machine and is preferably pitched rearwardly, as shown, and it may, if desired, form a part of the frame of the machine. I prefer, however, to connect it with the axle F of the rear wheel, which is preferably done by flattening its ends and providing them with apertures *a* to receive the axle, as better shown in Fig. 2 of the drawings.

G indicates foot-rests for the child on seat E, which are screwed on or otherwise connected with the axle F, and H indicates the flat spring, which serves the twofold function of connecting the fork D with the seat-support C and yieldingly supporting the child's seat E. This flat spring is preferably connected with the seat-support C by the same clamp I that fastens the seat B on said support, although it may be connected by other means, if desirable, to any suitable part that is connected with the frame of the machine. From said seat-support C the spring is carried rearwardly and connected with the upper end of the fork D, and is then bent upwardly and forwardly to form the yielding support *b* for the seat E, which may be connected by a clamp *c*, as shown, or in any other suitable manner. It will thus be seen that the single spring or spring-bar forms a yielding support for the seat E, so as to render the same easy and comfortable, and at the same time connects the fork D with the seat-support C, so as to hold said support in the position shown. The arrangement of the fork D and the connection of the same with the seat-support C is also desirable, for the reason that it distributes the weight of the child on the seat E between the axle and the seat-support C, carried by the main frame, and avoids placing such a burden on the axle as would be likely to break the same.

J indicates the hand-grasp for the child mounted on the seat E. This hand-grasp is preferably made so as to enable a child to grasp it with both hands, and it is disposed below and in rear of the seat B, but does not extend on opposite sides of the seat, in virtue of which it will not interfere with the driver mounting or dismounting from the machine. The said hand-grasp J is provided with a short bar K, as shown, and this bar is connected, preferably by a set-screw, to the seat-support C, as better shown in Fig. 2 of the drawings.

It will be appreciated from the foregoing that while my improvements afford a comfortable and safe seat for a child in rear of the rider they do not in any way interfere with the rider in mounting, dismounting, or riding, and it will also be observed that my improvements may be produced very cheaply and may be placed upon safety-bicycles such as at present in use without materially changing the construction or increasing the weight thereof, and may, when desired, be quickly removed.

I have described the seat E as being designed more especially to carry a child, but it is obvious that when desired the seat E may be used to advantage as a comfortable seat for an adult rider behind the rider who alone propels the machine.

I have also described my improvements as being especially applicable to safety-bicycles. I would, however, have it distinctly understood that the improvements may be embodied in other kinds of bicycles, and I reserve the right to so embody them. In lieu of the foot-rests G foot-rests such as those usually clamped to the front forks of bicycles and known as "coasters" may be clamped in the usual manner upon the fork D or upon the rear fork of the bicycle-frame at each side of the frame.

Having described my invention, what I claim is—

1. In a bicycle, the combination of a frame, the rear axle, the fork D, connected with the rear axle, the spring-bar connected at an intermediate point of its length with the upper end of the fork and having the upwardly and forwardly bent portion $b$, a connection between the spring-bar and frame, and the seat mounted on and secured to said portion $b$, of the spring-bar, substantially as and for the purpose set forth.

2. In a bicycle, the combination of the main frame, the rear axle, the seat-support carried by the main frame, the seat connected thereto, the fork D, connected with the rear axle, the spring-bar connected at its forward end with the seat-support and at an intermediate point of its length with the fork and having the upwardly and forwardly bent portion $b$, the seat mounted on and secured to said portion $b$, and the hand-grasp also connected with the seat-support; the said hand-grasp being disposed below the seat on the seat-support of the main frame and corresponding in length to the width of said seat, substantially as and for the purpose set forth.

In testimony whereof I affix my signature in presence of two witnesses.

LOUIS DE ROME.

Witnesses:
NEIL C. WHYTE,
J. E. DWYER.